Feb. 6, 1962  H. WEBER  3,020,215
DISTILLING APPARATUS
Filed May 22, 1958
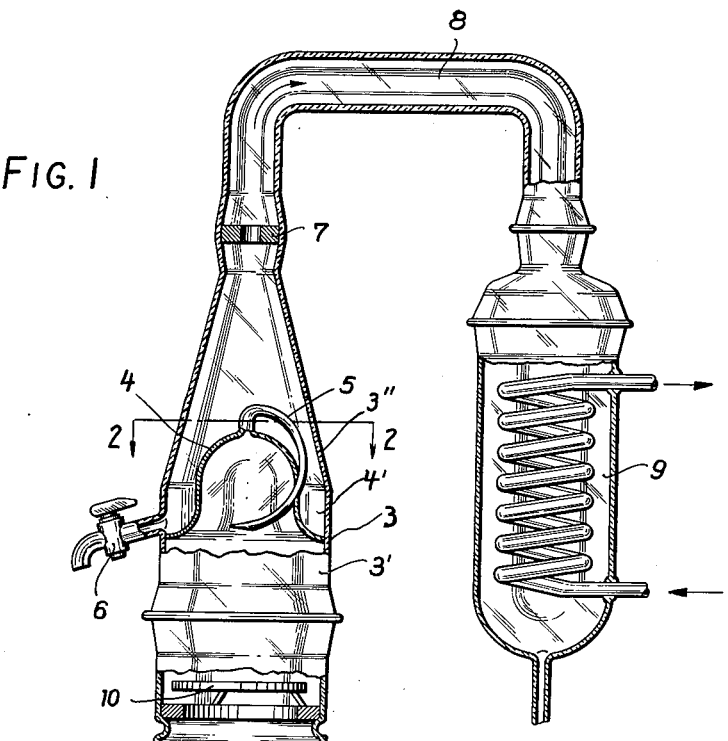
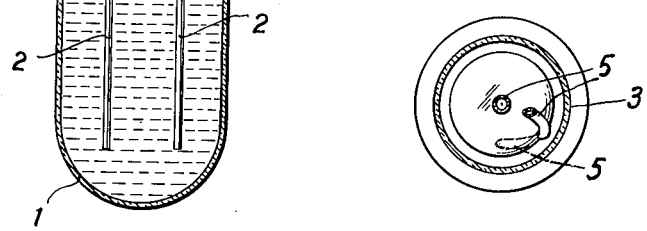
INVENTOR:
HANS WEBER
By Burgess, Dinklage & Sprung
ATTORNEYS 3,020,215
DISTILLING APPARATUS
Hans Weber, Mainz-Gonsenheim, Germany, assignor to Jenaer Glaswerk Schott & Gen., Mainz, Germany, a corporation of Germany
Filed May 22, 1958, Ser. No. 737,055
Claims priority, application Germany May 22, 1957
5 Claims. (Cl. 202—197)

The present invention relates to improvements in distilling apparatus.

The distilling apparatus which were known prior to this invention had the disadvantage that the steam generated in the still also took along droplets of the respective raw material to be distilled, so that the condensate did not possess the desired degree of purity. With these prior apparatus, it was, for example, generally impossible by means of a single distilling operation to attain a water which was entirely nonpyrogenic.

It is the principal object of the present invention to provide a distilling apparatus which avoids these disadvantages by very simple and reliable means.

According to the present invention, the still or retort of the apparatus is equipped with a cyclone separator which is mounted thereon and in which it is possible to separate any droplets of water from the steam which is generated in the still and is taken along thereby. This cyclone separator which is preferably disposed above the still consists of a substantially cylindrical lower part which is connected to the still, a funnel-shaped, upwardly converging upper part, an upwardly arched partition separating the lower and upper parts, and a jet tube connected to the uppermost point of this partition within the upper part of the cyclone separator, and extending back downwardly and partly around the arched partition and terminating in a nozzle pointing in a direction tangential to the partition. The annular part between the arched partition and the outer wall of the funnel-shaped upper part of the cyclone separator thus forms a vortex chamber. A suitable drain valve is connected to the lower end of this chamber for draining off any liquid which may be separated therein from the steam.

A large number of tests carried out with such an arrangement have shown that any droplets of the raw material in the still which might be taken along by the rising steam will be completely separated from the steam by the centrifugal force produced by the ejection of the steam into the vortex chamber and its whirling movement therein. Thus, it was found that even the monodistillate of water will be attained in an entirely nonpyrogenic form, and that a second or even a third distillation of the condensate will be superfluous.

Further objects, features, and advantages of the present invention will become apparent from the following detailed description thereof, particularly when read with reference to the accompanying drawing which diagrammatically illustrates one preferred embodiment of the invention.

FIG. 1 represents a longitudinal section through an apparatus in accordance with the invention, and FIG. 2 represents a horizontal cross-section taken through lines 2—2 of FIG. 1.

The distilling apparatus as shown in the drawing preferably consists of a glass vessel 1 forming a still or retort, in which the liquid to be treated, for example, water, is heated, for example, by a three-phase alternating current by means of two carbon electrodes 2 which are suspended into still 1. Above this vessel, a cyclone separator 3 is connected thereto which consists of a cylindrical lower part 3', and an upwardly highly arched partition 4 separating the lower and upper parts. At the uppermost point of this partition 4, a jet tube 5 is connected thereto which curves downwardly into the annular vortex chamber 4' which is formed between partition 4 and the lower end of the upper part 3''. The end of jet tube 5 forms a nozzle which extends in a direction substantially tangential to partition 4 near the lower end thereof.

In one specific embodiment of the invention the nozzle was made of such a size that, at an overpressure in still 1 of 0.25 atm., the steam emerged from the nozzle at a velocity of 80 to 100 m./sec. The steam will then whirl around the vortex chamber 4' and subsequently also in the conical part 3'' in which the steam will be concentrated. This whirling action will occur at such a velocity that all droplets which might have been taken along by steam from the boiling surface of the liquid in still 1 will be expelled from the steam and thrown by centrifugal force against the outer wall of the upper part 3'' of the cyclone separator. The separated liquid which has accumulated within the upper part 3'' and which, if water is being distilled, is still pyrogenic, is then drained off by a suitable valve 6 at the lower end of vortex chamber 4'. It has been found that the amount of liquid which is thus separated from the steam is relatively small, and that it amounts to no more than a few cubic centimeters per hour. However, even this small amount of liquid, if taken along by the steam to the condenser, would render the condensate useless for many purposes.

For separating larger drops of liquid from the rising steam, a deflecting plate 10 or the like is preferably provided above still 1.

The steam, after having been purified of any droplets of liquid, then flows upwardly within the conical part 3'' of the cyclone separator 3, and passes through a screen 7 and then through the connecting pipe 8 into the condenser 9 in which it will be condensed in the usual manner.

As another feature of the invention, it has been found that at least all of those parts of the distilling apparatus which come into contact with the distillate are preferably made of glass.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A distilling apparatus comprising a still and a cyclone separator mounted above said still and connected thereto, said cyclone separator having an upwardly arched partition therein separating said still from said cyclone separator and forming an annular vortex chamber at the outside thereof with said cyclone separator, said partition serving as an inlet for distillate from said still and a jet tube connected to the uppermost point of said partition and communicating therewith extending within said separator and downwardly into said vortex chamber in a direction substantialy tangential to said partition.

2. A distilling apparatus as defined in claim 1, further comprising valve-controlled outlet means connected to said cyclone separator near the lower end of said vortex chamber for draining off the liquid collected within said cyclone separator.

3. A distilling apparatus as defined in claim 1, wherein at least all of the parts of said apparatus which are adapted to come into contact with the distillate consist of glass.

4. A distilling apparatus comprising a still and a cyclone separator mounted above said still and connected thereto consisting of an upper conical part and a cylindrical lower part, said cyclone separator having an upwardly highly arched partition therein separating said still from said cyclone separator forming a narrow annular vortex chamber at the outside thereof with the lower end of said upper conical part of said cyclone separator and a jet tube connected to the uppermost point of said partition and communicating therewith extending within said separator and downwardly into said vortex chamber in a direction substantially tangential to said partition.

5. A distilling apparatus as defined in claim 4 wherein the free end of said jet tube is in the form of a nozzle.

References Cited in the file of this patent

UNITED STATES PATENTS

| | | |
|---|---|---|
| 2,059,522 | Hawley | Nov. 3, 1936 |
| 2,510,138 | Pulley et al. | June 6, 1950 |
| 2,543,001 | Dean | Feb. 27, 1951 |
| 2,610,142 | Lawrence | Sept. 9, 1952 |
| 2,649,408 | Williamson et al. | Aug. 18, 1953 |

OTHER REFERENCES

Food Industries, vol. 22, No. 8, pages 56, 169, August 1950.

Lawrence: Chem. Eng. Progress, vol. 48, No. 5, May 1952, pages 241–246.